(12) United States Patent
Flake

(10) Patent No.: US 7,818,629 B2
(45) Date of Patent: Oct. 19, 2010

(54) MULTIPLE WINNER ARBITRATION

(75) Inventor: Lance Flake, Longmont, CO (US)

(73) Assignee: Broadcom Corporation, Irvine, CA (US)

( * ) Notice: Subject to any disclaimer, the term of this patent is extended or adjusted under 35 U.S.C. 154(b) by 397 days.

(21) Appl. No.: 11/866,638

(22) Filed: Oct. 3, 2007

(65) Prior Publication Data
US 2009/0094487 A1    Apr. 9, 2009

(51) Int. Cl.
*G06F 11/00* (2006.01)
(52) U.S. Cl. .......................................... 714/45; 714/47
(58) Field of Classification Search ............... 714/45, 714/42, 47, 54, 44; 711/112; 712/227
See application file for complete search history.

(56) References Cited

U.S. PATENT DOCUMENTS

| | | | |
|---|---|---|---|
| 6,438,715 B1 * | 8/2002 | Assouad | 714/45 |
| 6,745,351 B1 * | 6/2004 | Mastro | 714/57 |
| 2003/0061550 A1 * | 3/2003 | Ng et al. | 714/45 |
| 2004/0064763 A1 * | 4/2004 | Swoboda | 714/45 |
| 2005/0268177 A1 * | 12/2005 | John | 714/47 |
| 2007/0220360 A1 * | 9/2007 | Weinert et al. | 714/45 |
| 2007/0260935 A1 * | 11/2007 | Branda et al. | 714/45 |

* cited by examiner

*Primary Examiner*—Dieu-Minh Le
(74) *Attorney, Agent, or Firm*—Garlick Harrison & Markison; Kevin L. Smith

(57) ABSTRACT

A method to combine trace data for multiple systems within an embedded system is provided. This method involves coupling a set of trace sources within the embedded system to a trace system. A subset of trace source(s) may then be selected from the set of trace sources. The subset of trace sources may be formatted to produce a packetized trace stream. The packetized trace stream may then be provided to external interface circuitry. External circuitry coupled to the trace system allows for analysis of the packetized trace streams regarding internal operations within the embedded system. An arbitrator may determine which trace source(s) from the set of trace sources are selected to be within the subset of trace sources. The arbitrator may use several criteria to make this determination.

14 Claims, 9 Drawing Sheets

| | Stream Byte 3 | Stream Byte 2 | Stream Byte 1 | Stream Byte 0 |
|---|---|---|---|---|
| Stream Value 0 | Data$_0$[27:20] | Data$_0$[19:12] | Data$_0$[11:4] | Data$_0$[3:0], ID$_0$ |
| Stream Value 1 | Data$_1$[23:16] | Data$_1$[15:8] | Data$_1$[7:0] | ID$_1$, Data$_0$[31:28] |
| Stream Value 2 | Data$_2$[19:12] | Data$_2$[11:4] | Data$_2$[3:0], ID$_2$ | Data$_1$[31:24] |
| Stream Value 3 | Data$_3$[15:8] | Data$_3$[7:0] | ID$_3$, Data$_2$[31:28] | Data$_2$[27:20] |
| Stream Value 4 | Data$_4$[11:4] | Data$_4$[3:0], ID$_4$ | Data$_3$[31:24] | Data$_3$[23:16] |
| Stream Value 5 | Data$_5$[7:0] | ID$_5$, Data$_4$[31:28] | Data$_4$[27:20] | Data$_4$[19:12] |
| Stream Value 6 | Data$_6$[3:0], ID$_6$ | Data$_5$[31:24] | Data$_5$[23:16] | Data$_5$[15:8] |
| Stream Value 7 | XX, Data$_6$[31:28] | Data$_6$[27:20] | Data$_6$[19:12] | Data$_6$[11:4] |

FIG. 7 ated in the FIGS., like numerals being used to refer to like and corresponding parts of the various drawings.

MULTIPLE WINNER ARBITRATION

TECHNICAL FIELD OF THE INVENTION

Embodiments of the present invention relate generally to memory storage devices; and, more particularly, embodiments of the present invention relate to trace systems within embedded systems of memory storage devices.

BACKGROUND OF THE INVENTION

As is known, many varieties of memory storage devices (e.g. disk drives), such as magnetic disk drives are used to provide data storage for a host device, either directly, or through a network such as a storage area network (SAN) or network attached storage (NAS). Typical host devices include stand alone computer systems such as a desktop or laptop computer, enterprise storage devices such as servers, storage arrays such as a redundant array of independent disks (RAID) arrays, storage routers, storage switches and storage directors, and other consumer devices such as video game systems and digital video recorders. These devices provide high storage capacity in a cost effective manner.

The structure and operation of hard disk drives is generally known. Hard disk drives include, generally, a case, a hard disk having magnetically alterable properties, and a read/write mechanism including Read/Write (RW) heads operable to write data to the hard disk by locally alerting the magnetic properties of the hard disk and to read data from the hard disk by reading local magnetic properties of the hard disk. The hard disk may include multiple platters, each platter being a planar disk.

All information stored on the hard disk is recorded in tracks, which are concentric circles organized on the surface of the platters. FIG. 1 depicts a pattern of radially-spaced concentric data tracks 12 within a disk 10. Data stored on the disks may be accessed by moving RW heads radially as driven by a head actuator to the radial location of the track containing the data. To efficiently and quickly access this data, fine control of RW hard positioning is required. The track-based organization of data on the hard disk(s) allows for easy access to any part of the disk, which is why hard disk drives are called "random access" storage devices.

Since each track typically holds many thousands of bytes of data, the tracks are further divided into smaller units called sectors. This reduces the amount of space wasted by small files. Each sector holds 512 bytes of user data, plus as many as a few dozen additional bytes used for internal drive control and for error detection and correction.

Within such hard disk drives (HDDs), disk drive controllers control the various processes associated with the read/write of data to the physical media. As to the complexity of these disk drive controllers continues to increase, better debugging tools are required to improve the operation and design of the disk drive controller. One technology that may be used to address these issues is hardware trace data, which can be used to easily track operations within embedded systems. Trace data may be presented to an external system to track down or monitor operations within a processor such as the disk drive controller. This hardware trace is useful for addressing a wide variety of issues associated with embedded systems. This is because embedded systems often involve meeting critical timing requirements. A dedicated trace port allows external analysis of the execution of processes within the embedded processor. However, as trace analysis tools improve, more information and more embedded trace systems may be incorporated within the embedded system. Thus the trace port can become a bottleneck associated with retrieving this data.

SUMMARY OF THE INVENTION

Embodiments of the present invention are directed to systems and methods that are further described in the following description and claims. Advantages and features of embodiments of the present invention may become apparent from the description, accompanying drawings and claims.

BRIEF DESCRIPTION OF THE DRAWINGS

For a more complete understanding of the present invention and the advantages thereof, reference is now made to the following description taken in conjunction with the accompanying drawings in which like reference numerals indicate like features and wherein:

FIG. 7 provides an example if a formatted frame of trace values in accordance with embodiments of the present invention;

DETAILED DESCRIPTION OF THE INVENTION

Preferred embodiments of the present invention are illustrated in the FIGS., like numerals being used to refer to like and corresponding parts of the various drawings.

Embodiments of the present invention provide a method to combine trace data for multiple systems within an embedded system such as but not limited to a disk drive controller. This method involves coupling a set of trace sources within the embedded system to a trace system. A subset of trace source(s) may then be selected from the received set of trace sources. The subset of trace source(s) may be formatted to produce a packetized trace stream. The packetized trace stream may then be provided to external interface circuitry. External circuitry coupled to the trace system allows for analysis of the packetized trace streams regarding internal operations within the embedded system. An arbitrator may determine which trace source(s) from the set of trace sources are selected to be within the subset of trace source(s). The arbitrator may use several criteria to make this determination. For example, this determination may be made based on user input where an engineer desires to see to trace the operation of specific systems within the embedded system.

Figure 1:
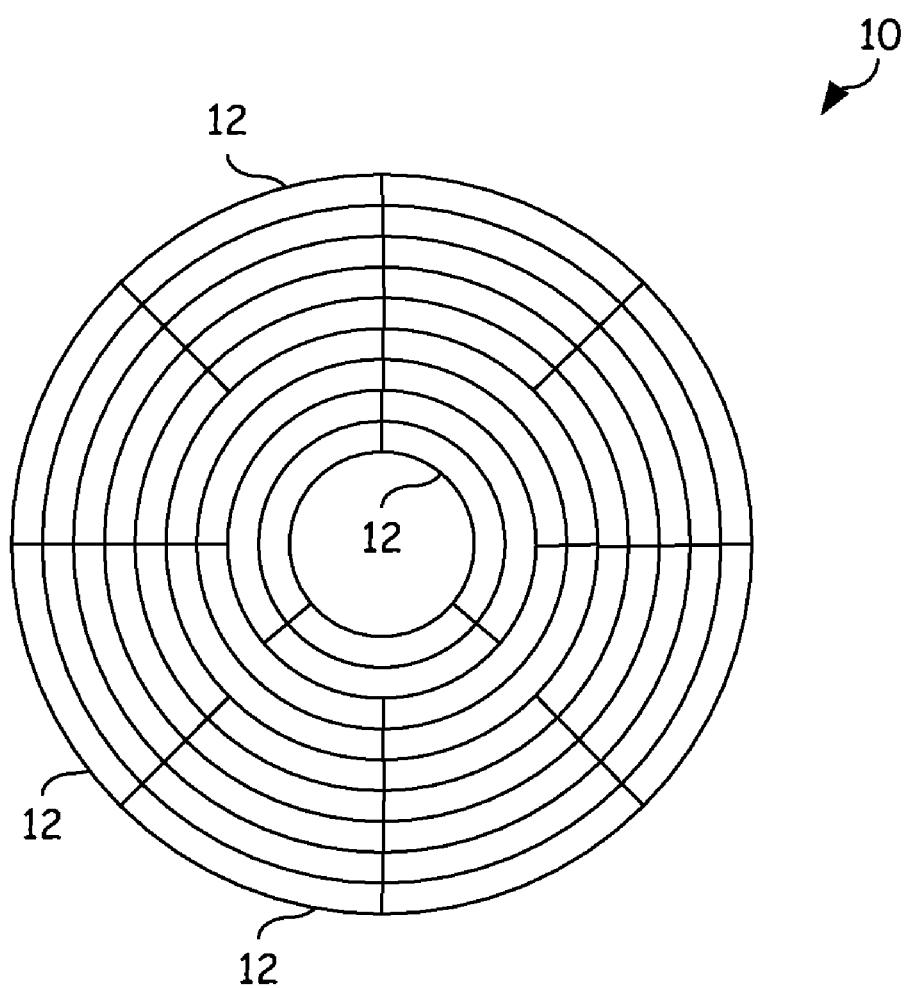
FIG. 1 depicts a prior art pattern of radially-spaced concentric data tracks within the magnetic media of a disk.
Figure 2:
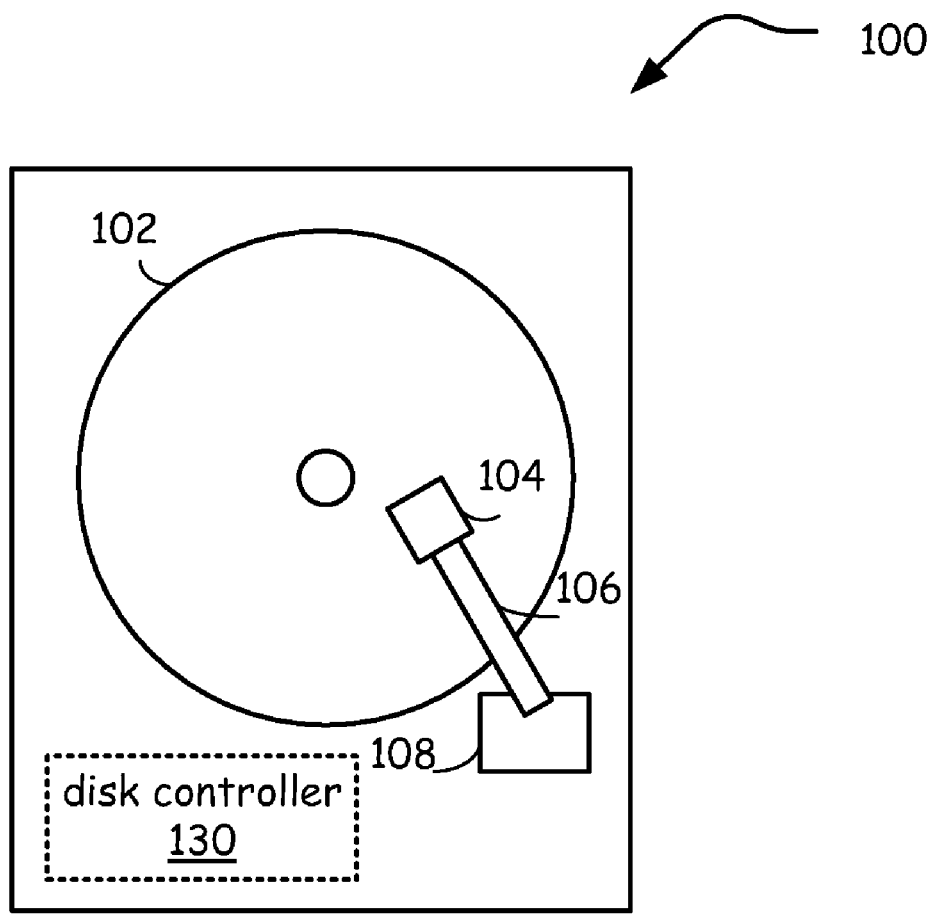
FIG. 2 illustrates an embodiment of a disk drive unit in accordance with embodiments of the present invention.

FIG. 2 illustrates an embodiment of a disk drive unit 100 that may utilize an embedded trace system in accordance with embodiments of the present invention. In particular, disk drive unit 100 includes a disk 102 that is rotated by a servo motor (not specifically shown) at a velocity such as 3600 revolutions per minute (RPM), 4200 RPM, 4800 RPM, 5,400 RPM, 7,200 RPM, 10,000 RPM, 15,000 RPM, however, other velocities including greater or lesser velocities may likewise be used, depending on the particular application and implementation in a host device. In one possible embodiment, disk 102 can be a magnetic disk that stores information as magnetic field changes on some type of magnetic medium. The medium can be a rigid or non-rigid, removable or non-removable, that consists of or is coated with magnetic material.

Disk drive unit 100 further includes one or more read/write heads 104 that are coupled to arm 106 that is moved by actuator 108 over the surface of the disk 102 either by translation, rotation or both. A disk controller 130 is included for controlling the read and write operations to and from the drive, for controlling the speed of the servo motor and the motion of actuator 108, and for providing an interface to and from the host device. Embedded trace systems within disk controller 130 will be discussed with reference to FIG. 5 and following.

Figure 3:
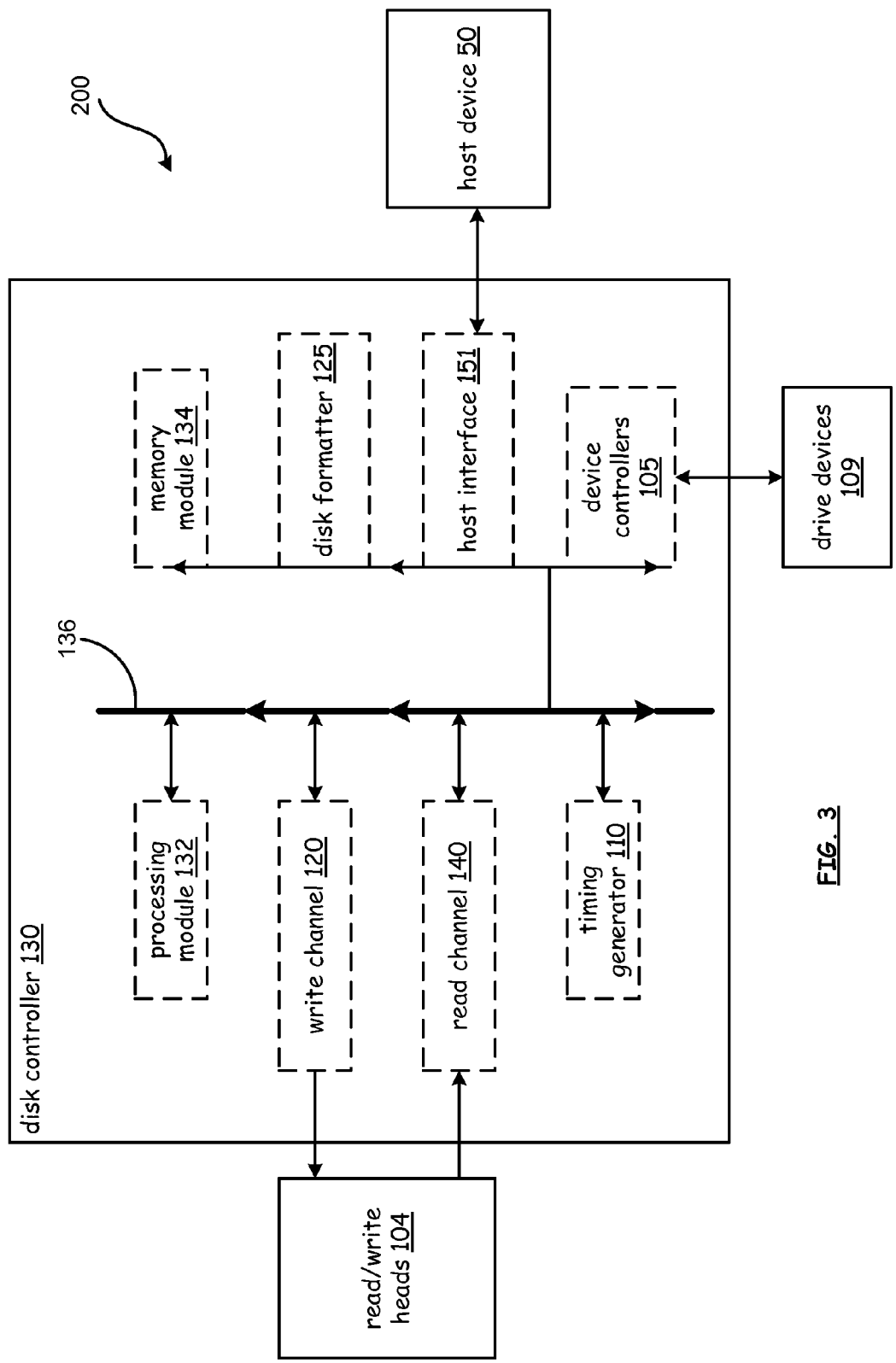
FIG. 3 illustrates an embodiment of a disk controller 130 in accordance with embodiments of the present invention.

FIG. 3 illustrates an embodiment of a disk controller 130. Disk controller 130 includes a read channel 140 and write channel 120 for reading and writing data to and from disk 102 through read/write heads 104. Disk formatter 125 is included for controlling the formatting of disk drive unit 100, timing generator 110 provides clock signals and other timing signals, device controllers 105 control the operation of drive devices 109 such as actuator 108 and the servo motor, etc. Host interface 151 receives read and write commands from host device 50 and transmits data read from disk 102 along with other control information in accordance with a host interface protocol. In one possible embodiment, the host interface protocol can include, SCSI, SATA, enhanced integrated drive electronics (EIDE), or any number of other host interface protocols, either open or proprietary, that can be used for this purpose.

Disk controller 130 further includes a processing module 132 and memory module 134. Processing module 132 can be implemented using one or more microprocessors, micro-controllers, digital signal processors (DSPs), microcomputers, central processing units (CPUs), field programmable gate arrays (FPGAs), programmable logic devices (PLAs), state machines, logic circuits, analog circuits, digital circuits, and/or any devices that manipulates signal (analog and/or digital) based on operational instructions that are stored in memory module 134. When processing module 132 is implemented with two or more devices, each device can perform the same steps, processes or functions in order to provide fault tolerance or redundancy. Alternatively, the function, steps and processes performed by processing module 132 can be split between different devices to provide greater computational speed and/or efficiency.

Memory module 134 may be a single memory device or a plurality of memory devices. Such a memory device may be a read-only memory (ROM), random access memory (RAM), volatile memory, non-volatile memory, static random access memory (SRAM), dynamic random access memory (DRAM), flash memory, cache memory, and/or any device that stores digital information. Note that when the processing module 132 implements one or more of its functions via a state machine, analog circuitry, digital circuitry, and/or logic circuitry, the memory module 134 storing the corresponding operational instructions may be embedded within, or external to, the circuitry comprising the state machine, analog circuitry, digital circuitry, and/or logic circuitry. Further note that, the memory module 134 stores, and the processing module 132 executes, operational instructions that can correspond to one or more of the steps or a process, method and/or function illustrated herein.

Disk controller 130 includes a plurality of modules, in particular, device controllers 105, timing generator 110, processing module 132, memory module 134, write channel 120, read channel 140, disk formatter 125, and host interface 151 that are interconnected via bus 136. Each of these modules can be implemented in hardware, firmware, software or a combination thereof, in accordance with the broad scope of the present invention. While the particular bus architecture is shown in FIG. 3 with a single bus 136, alternative bus architectures that include additional data buses, further connectivity, such as direct connectivity between the various modules, are likewise possible to implement additional features and functions.

In one possible embodiment, one or more (possible all) modules of disk controller 130 are implemented as embedded systems within a system on a chip (SOC) integrated circuit. In such a possible embodiment, this SOC integrated circuit includes a digital portion that can include additional modules such as protocol converters, linear block code encoding and decoding modules, etc., and an analog portion that includes device controllers 105 and optionally additional modules, such as a power supply, etc. In an alternative embodiment, the various functions and features of disk controller 130 are implemented in a plurality of integrated circuit devices that communicate and combine to perform the functionality of disk controller 130. To monitor the operations of these modules, embedded trace systems may be implemented within the integrated circuit.

As previously stated, typical trace systems each require a dedicated trace port to provide trace data to external analysis tools. Embodiments of the present invention offer a significant technical advantage by providing a method to combine trace data for multiple systems within an embedded system such as but not limited to a disk drive controller. This allows a set of trace sources within the embedded system to use common interface circuitry. A subset of trace source(s) may then be selected from the set of trace sources. The subset of trace source(s) may then be formatted to produce a trace stream which is provided to external interface circuitry. External tools that couple to the common interface circuitry, and hence the trace system, allow for analysis of the trace streams regarding internal operations within the embedded system.

Figure 4:
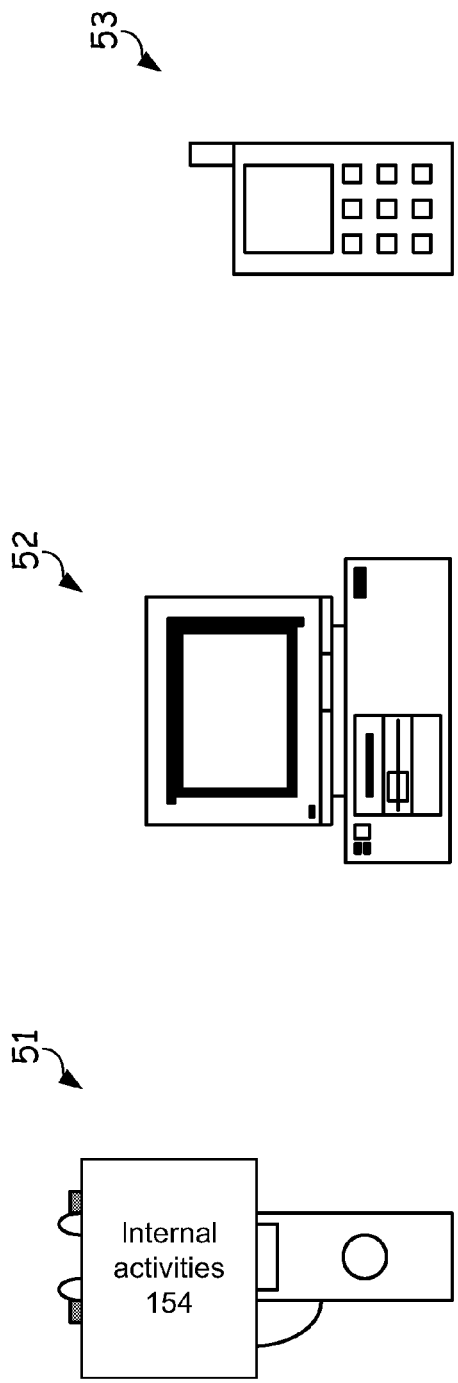
FIGS. 4A through 4E illustrate various devices that employ hard disk drives unit in accordance with embodiments of the present invention.

FIGS. 4A through 4E illustrate various devices that employ hard disk drives unit in accordance with embodiments of the present invention. FIG. 4A illustrates an embodiment of a handheld audio unit 51. In particular, disk drive unit 100 can be implemented in the handheld audio unit 51. In one possible embodiment, the disk drive unit 100 can include a small form factor magnetic hard disk whose disk 102 has a diameter 1.8" or smaller that is incorporated into or otherwise used by handheld audio unit 51 to provide general storage or storage of audio content such as motion picture expert group (MPEG) audio layer 3 (MP3) files or Windows Media Architecture (WMA) files, video content such as MPEG4 files for playback to a user, and/or any other type of information that may be stored in a digital format.

FIG. 4B illustrates an embodiment of a computer 52. In particular, disk drive unit 100 can be implemented in the computer 52. In one possible embodiment, disk drive unit 100 can include a small form factor magnetic hard disk whose disk 102 has a diameter 1.8" or smaller, a 2.5" or 3.5" drive or larger drive for applications such as enterprise storage applications. Disk drive 100 is incorporated into or otherwise used by computer 52 to provide general purpose storage for any type of information in digital format. Computer 52 can be a desktop computer, or an enterprise storage devices such a server, of a host computer that is attached to a storage array such as a redundant array of independent disks (RAID) array, storage router, edge router, storage switch and/or storage director.

FIG. 4C illustrates an embodiment of a wireless communication device 53. In particular, disk drive unit 100 can be implemented in the wireless communication device 53. In one possible embodiment, disk drive unit 100 can include a small form factor magnetic hard disk whose disk 102 has a diameter 1.8" or smaller that is incorporated into or otherwise used by wireless communication device 53 to provide general storage or storage of audio content such as motion picture expert group (MPEG) audio layer 3 (MP3) files or Windows Media Architecture (WMA) files, video content such as MPEG4 files, JPEG (joint photographic expert group) files, bitmap files and files stored in other graphics formats that may be captured by an integrated camera or downloaded to the wireless communication device 53, emails, webpage information and other information downloaded from the Internet, address book information, and/or any other type of information that may be stored in a digital format.

In a possible embodiment, wireless communication device 53 is capable of communicating via a wireless telephone network such as a cellular, personal communications service (PCS), general packet radio service (GPRS), global system for mobile communications (GSM), and integrated digital enhanced network (iDEN) or other wireless communications network capable of sending and receiving telephone calls. Further, wireless communication device 53 is capable of communicating via the Internet to access email, download content, access websites, and provide steaming audio and/or video programming. In this fashion, wireless communication device 53 can place and receive telephone calls, text messages such as emails, short message service (SMS) messages, pages and other data messages that can include attachments such as documents, audio files, video files, images and other graphics.

FIG. 4D illustrates an embodiment of a personal digital assistant (PDA) 54. In particular, disk drive unit 100 can be implemented in the personal digital assistant (PDA) 54. In one possible embodiment, disk drive unit 100 can include a small form factor magnetic hard disk whose disk 102 has a diameter 1.8" or smaller that is incorporated into or otherwise used by personal digital assistant 54 to provide general storage or storage of audio content such as motion picture expert group (MPEG) audio layer 3 (MP3) files or Windows Media Architecture (WMA) files, video content such as MPEG4 files, JPEG (joint photographic expert group) files, bitmap files and files stored in other graphics formats, emails, webpage information and other information downloaded from the Internet, address book information, and/or any other type of information that may be stored in a digital format.

FIG. 4E illustrates an embodiment of a laptop computer 55. In particular, disk drive unit 100 can be implemented in the laptop computer 55. In one possible embodiment, disk drive unit 100 can include a small form factor magnetic hard disk whose disk 102 has a diameter 1.8" or smaller, or a 2.5" drive. Disk drive 100 is incorporated into or otherwise used by laptop computer 52 to provide general purpose storage for any type of information in digital format.

Figure 5:
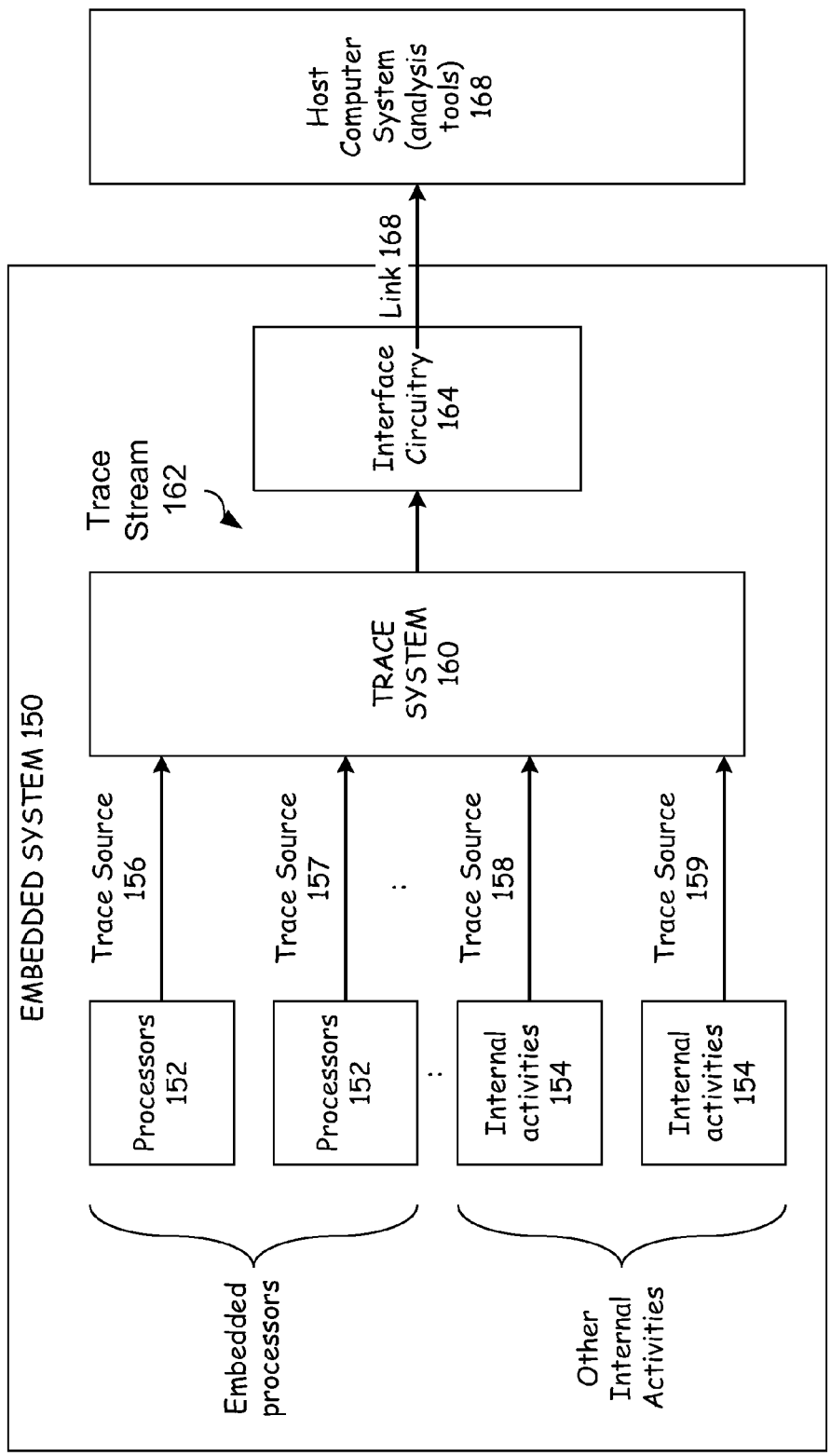
FIG. 5 provides a functional block diagram of an embedded system having an embedded trace system therein in accordance with embodiments of the present invention.

FIG. 5 provides a functional block diagram of an embedded system having an embedded trace system therein in accordance with embodiments of the present invention. Embedded system 150 may be a disc controller for an HDD or other like device that has multiple systems embedded therein. Processors within a HDD controller, automotive controller, or other real time controller which may be used to directly control servos or other mechanisms require that the processor not be halted. Therefore analysis of these systems relies on and is enhanced by the ability to trace internal operations of the components i.e. processors and other internal activities within an embedded system.

As shown embedded system 150 includes one or more processors 152, other additional internal activities 154 such as but not limited to shared buffer accesses, trace source(s) 156, trace source(s) 158, trace system 160, trace stream 162, interface circuitry 164, and communication link 166. An external computing system communicatively coupled to the embedded system via communication link 166 may host a trace analysis tool 168. Trace System 160 provides for a more complete way to view the internal operation of embedded system 150 than was previously possible. Typically trace systems focus on a single embedded activity such as a single processor 152. Typical trace systems do not provide a way to coordinate capture of other system activity within the embedded system. As shown embedded system 150 may include one or more processors 152 as well as various additional internal activities 154 which each may have trace sources which each may provide trace data to trace system 160. Trace system 160 provides a way of combining multiple types of trace data in such a way as to enable an external host computer on which an analysis tool operates to receive, separate and analyze individual trace sources. Trace system 160 is agnostic to the nature of each type of trace data contained with individual trace source(s) 156 and 158. Trace system 160 chooses a subset of the set of trace sources 156-158 provided to trace system 160 to produce a combined stream of data values in the form of trace stream 162. Trace system 160 may format data from trace sources 156-158 which may then be provided as trace stream 162 to interface circuitry 164 such as but not limited to a high-speed serial trace links that allows high data rate information to be extracted from numerous trace sources, parallel port, a serial port or other like port which may or may not be a dedicated trace system port.

Figure 6:
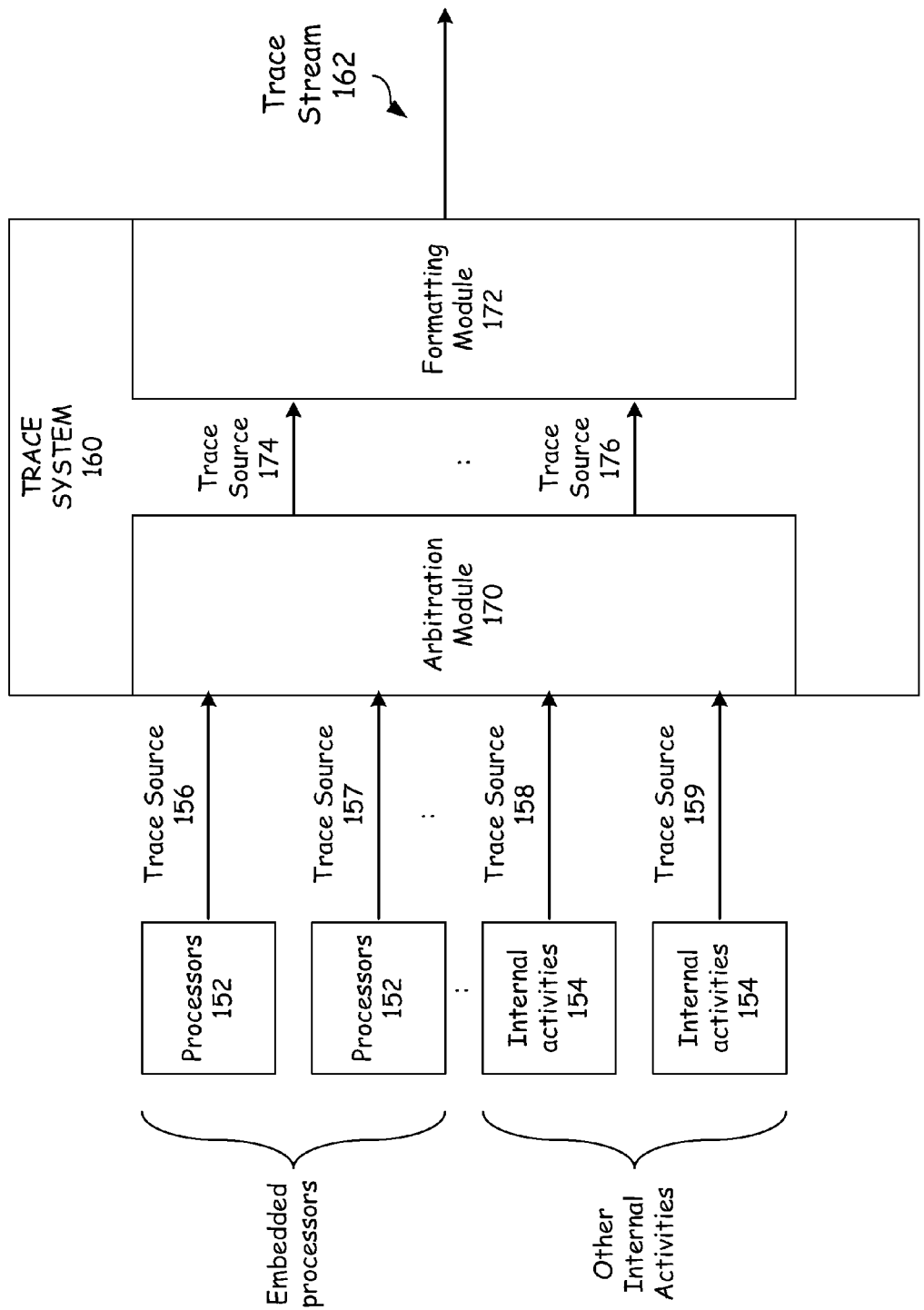
FIG. 6 provides a functional block diagram of an embedded trace system in accordance with embodiments of the present invention.

FIG. 6 depicts the internal functional modules of trace system 160 in further detail in accordance with an embodiment of the present invention. Trace system 160 includes at a minimum arbitration module 170 and formatting module 172. Trace system 160 receives multiple trace sources exemplified by trace sources 156 and 158. Each source may include a binary data value of some width (e.g., 32 bits) and binary identification values of some width (e.g., 4 bits). These widths are provided as examples and do not require these specific values. Additionally each trace source may have different widths. Each source can potentially produce a new data value each clock trace cycle. Within the trace system, arbitration module 170 selects a subset of trace source(s) from the trace sources provided to the trace system. The trace system then creates a formatted stream of values of a predetermined width (i.e. trace stream 162). For example, arbitration module 170 may choose one or more of the trace sources provided to the arbitration module as an output of the arbitration module. These chosen trace sources which are a subset of the set of trace sources received by arbitration module 170 are shown as trace source(s) 174 and 176. Formatting module 172 receives the subset of trace sources 174 and 176 to create trace stream 162. Trace sources 174 and 176 still contain both identification and data values. Formatting module 172 takes the arbitrated (chosen) source(s) 174 and 176 to create the trace stream. The trace stream feeds interface circuitry 164 within the embedded system as depicted in FIG. 5.

Arbitration module 170 may be coupled to control circuitry which directs the arbitration module's selection of the subset of trace source(s). Arbitration module 170 may use many different policies for choosing which input trace source(s) is selected as the trace sources provided to formatting module 172. For example, in one embodiment, the number of trace sources chosen may be based on the width of those trace source(s) and the available width at the input of a formatting module 172. Within another embodiment, user input received through control circuitry may specify which traces are to be selected.

Embodiments of the present invention may include a time-stamping feature associated with the input trace source(s) provided to the trace system or a time-stamping function provided by the tracing system and incorporated within the trace stream. This time-stamping function would allow the various trace sources that are analyzed to be examined in a common time domain.

The multiple trace sources combined in embodiments of the present invention are selected. Thus some traces may not be selected. This situation may result in the loss of trace data which is commonly stored in a buffer that provides the trace source data to the trace system. These buffers may overflow when individual traces are not selected. In embodiments with sufficient width, all trace sources may be selected and formatted into the trace stream for analysis. Other embodiments may select a subset which may result in the loss of some data for unselected trace sources.

FIG. 7 provides an example of a formatted frame of trace values in accordance with embodiments of the present invention. The formatter module produces frames of trace identification and data values. The frame composition can be defined in various ways to mix the two value types. FIG. 7 shows a simple frame composition that interleaves a 4-bit identification and a 32-bit data values for each arbitrated source for a 32-bit stream width. In this example every 7 pairs of values creates a new frame. The last byte of the frame contains 4 unused bits. Other frame compositions are possible, possibly with reduced overhead amounts.

To help with frame decomposition within the host computer the formatter module may periodically insert frame synchronization values. One approach may reserve an identification value of all 1's for synchronization, and produce a stream value of all 1's. This stream value would be easily found within a sequence by the host computer. The next stream value would then be the beginning of a frame. The periodicity of frame synchronization values would primarily be determined by a particular system's requirements for error recovery.

Figure 8:
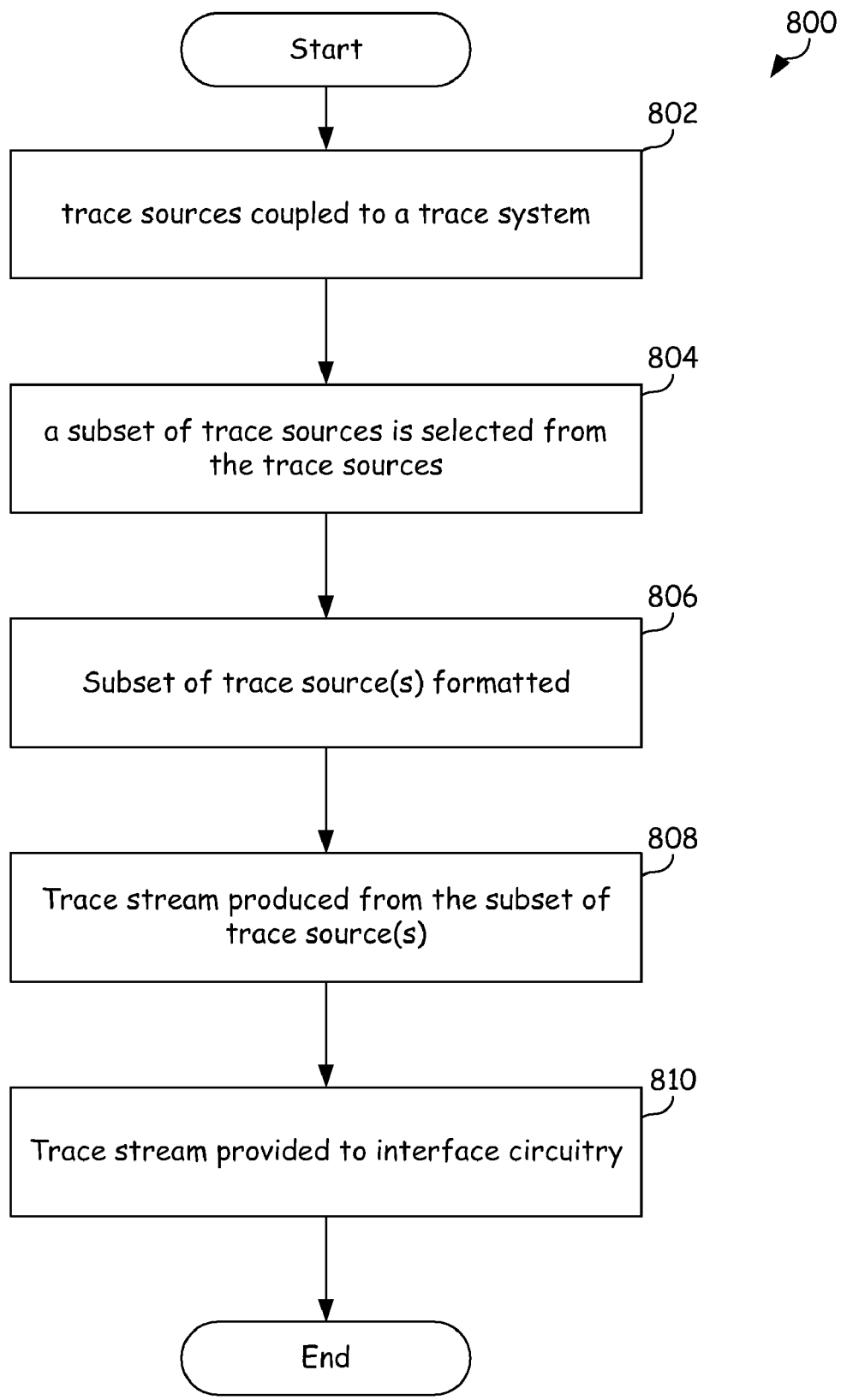
FIG. 8 provides a logic flow diagram illustrating one method of combining trace data from multiple systems within an embedded system in accordance with embodiments of the present invention.

FIG. 8 provides a logic flow diagram illustrating one method of combining trace data from multiple systems within an embedded system in accordance with embodiments of the present invention. Operations 800 begin in Step 802 where a set of trace sources within the embedded system are coupled to a trace system. In one embodiment there may be eight trace sources wherein these trace sources are received from processors or other internal activities within the embedded system. However any number of trace sources may be contained within the embedded system. Thus, in Step 802 a set of trace sources within the embedded system are provided to a trace system. In Step 804 a subset of trace sources is selected from the set of trace sources. Several different criteria may be used to determine which trace sources are selected. These may be based on user input, control logic, or other criteria. A subset of trace sources may then be formatted in Step 806 to produce a trace stream in Step 808. This trace stream will then be provided to external interface circuitry in Step 810.

Figure 9:
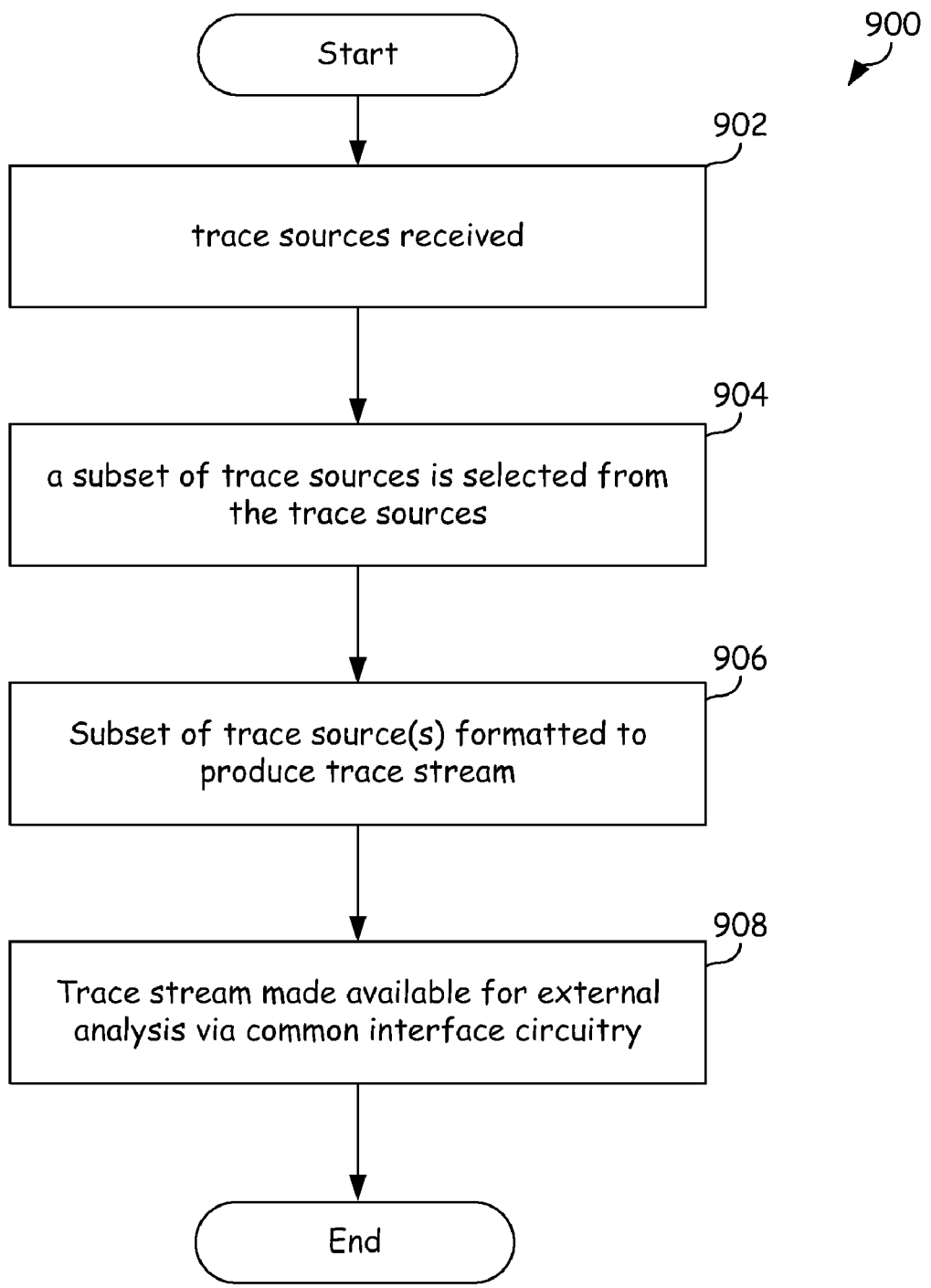
FIG. 9 provides a second logic flow diagram illustrating another method of combining trace data from multiple systems within an embedded system in accordance with embodiments of the present invention.

FIG. 9 provides a second logic flow diagram illustrating another method of combining trace data from multiple systems within an imbedded system in accordance with embodiments of the present invention. Operations 900 begin in Step 902 where a set of trace sources are received from various processor(s) and/or other internal activities within the embedded system. In Step 904 a subset of trace source(s) is selected from the set of trace sources received in Step 902. Several different criteria may be used to determine which trace sources are selected. The subset of trace source(s) is then formatted to produce a trace stream in Step 906. This trace stream may be made available to external analysis tools via common external interface circuitry in Step 908.

Although as described above the embedded trace system is applied specifically to a HDD disk controller embodiments of the present invention may be applied to any embedded system having multiple processors and/or internal activities which would benefit from the ability to select trace sources for external analysis. Additionally embodiments of the present invention allow a more complete understanding of the internal operations of the embedded system by allowing multiple traces from processor(s) and/or other internal activities within the embedded system to be analyzed. Thus information from an individual trace source when analyzed with information from at least one additional trace source may allow a greater (more complete) understanding of the integrated operation of systems within the embedded system.

The present invention provides a distinct advantage in that the number of external ports associated with multiple trace systems is greatly reduced. Thus multiple trace sources may be accessed through a single trace port or port configurable to support the export of trace source data to an external host.

In summary, the present invention provides a method to combine trace data for multiple systems within an embedded system. This method involves coupling a set of trace sources within the embedded system to a trace system. A subset of trace source(s) may then be selected from the set of trace sources. The subset of trace source(s) may be formatted to produce a packetized trace stream. The packetized trace stream may then be provided to external interface circuitry. External circuitry coupled to the trace system allows for analysis of the packetized trace streams regarding internal operations within the embedded system. An arbitrator may determine which trace sources from the set of trace sources are selected to be within the subset of trace sources. The arbitrator may use several criteria to make this determination.

As one of average skill in the art will appreciate, the term "substantially" or "approximately", as may be used herein, provides an industry-accepted tolerance to its corresponding term. Such an industry-accepted tolerance ranges from less than one percent to twenty percent and corresponds to, but is not limited to, component values, integrated circuit process variations, temperature variations, rise and fall times, and/or thermal noise. As one of average skill in the art will further appreciate, the term "operably coupled", as may be used herein, includes direct coupling and indirect coupling via another component, element, circuit, or module where, for indirect coupling, the intervening component, element, circuit, or module does not modify the information of a signal but may adjust its current level, voltage level, and/or power level. As one of average skill in the art will also appreciate, inferred coupling (i.e., where one element is coupled to another element by inference) includes direct and indirect coupling between two elements in the same manner as "operably coupled". As one of average skill in the art will further appreciate, the term "compares favorably", as may be used herein, indicates that a comparison between two or more elements, items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

Although the present invention is described in detail, it should be understood that various changes, substitutions and alterations can be made hereto without departing from the spirit and scope of the invention as described by the appended claims.

What is claimed is:

1. A method to combine trace data from multiple trace sources within an embedded system, comprising:
    coupling a plurality of trace data from a corresponding set of trace sources within the embedded system to an arbiter of a trace system within the embedded system;
    selecting a subset of trace sources in the arbiter, in which the subset is less than a number of trace sources determining the set of trace sources;
    formatting trace data only from the subset of trace sources to produce a packetized trace stream; and
    providing the packetized trace stream to an interface circuitry to couple externally from the embedded system.

2. The method of claim 1, further comprising analyzing the packetized trace stream to determine internal operations of the embedded system.

3. The method of claim 1, wherein the arbitrator selects the subset of trace sources based on user input.

4. The method of claim 1, wherein the packetized trace stream includes a binary identification value associated with each of the trace data of the selected subset of trace sources.

5. The method of claim 4, wherein the arbitrator selects the trace data based on an available width to be formatted for external coupling.

6. The method of claim 3, wherein each binary identification value is used to separate the trace data of the selected subset of trace sources when the trace data is formatted to produce the packetized trace stream.

7. The method of claim 4, wherein each binary identification value identifies trace data to corresponding trace sources.

8. An embedded trace system for a hard disk drive device, the embedded trace system comprising:
    an arbitration module operable to:
        receive a plurality of trace data from corresponding set of trace sources within the hard disk drive device;
        select a subset of trace sources, in which the subset is less than a number of trace sources determining the set of trace sources; and
        transfer trace data only from the subset of trace sources; and
    a formatting module operable to:
        receive trace data only from the subset of trace sources selected by the arbitration module;
        format the trace data from the subset of trace sources into a trace stream; and
        output the trace stream to an interface circuitry.

9. The embedded trace system of claim 8, further comprising a control module operable to direct the arbitration module's selection of the subset of trace sources.

10. The embedded trace system of claim 8, wherein the interface circuitry couples to an analysis tool, wherein the analysis tool is used to analyze the trace stream to determine internal operations of the hard disk drive device.

11. The embedded trace system of claim 8, wherein the arbitration module selects the subset of trace sources based on user input.

12. The embedded trace system of claim 8, wherein the trace stream includes a binary identification value associated with each trace data of the subset of trace sources.

13. The embedded trace system of claim 12, wherein the arbitration module selects the subset of trace sources based on an available data width to be formatted.

14. The embedded trace system of claim 12, wherein each binary identification value is used to separate the each trace source of the subset of trace sources by an analysis tool.

* * * * *

UNITED STATES PATENT AND TRADEMARK OFFICE
CERTIFICATE OF CORRECTION

Page 1 of 1

PATENT NO. : 7,818,629 B2
APPLICATION NO. : 11/866638
DATED : October 19, 2010
INVENTOR(S) : Lance Flake It is certified that error appears in the above-identified patent and that said Letters Patent is hereby corrected as shown below:

Col. 10, line 1, in Claim 6: Replace "The method of claim 3" with --The method of claim 4--

Signed and Sealed this
Tenth Day of July, 2012

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 7,818,629 B2 | Page 1 of 1 |
| APPLICATION NO. | : 11/866638 | |
| DATED | : October 19, 2010 | |
| INVENTOR(S) | : Lance Flake | |

It is certified that error appears in the above-identified patent and that said Letters Patent is hereby corrected as shown below:

Col. 9, lines 24-25, in Claim 1: replace "arbiter" with --arbitrator--
    Col. 9, line 26, in Claim 1: replace "arbiter" with --arbitrator--

Signed and Sealed this
Twenty-fifth Day of September, 2012

David J. Kappos
*Director of the United States Patent and Trademark Office*